US010970354B2

(12) United States Patent
Steffen

(10) Patent No.: US 10,970,354 B2
(45) Date of Patent: Apr. 6, 2021

(54) METHOD FOR PROCESSING CODE AND INCREASING WEBSITE AND CLIENT INTERACTION SPEED

(71) Applicant: Songtradr, Inc., Santa Monica, CA (US)

(72) Inventor: Helge Christian Steffen, Los Angeles, CA (US)

(73) Assignee: SONGTRADR, INC., Santa Monica, CA (US)

( * ) Notice: Subject to any disclaimer, the term of this patent is extended or adjusted under 35 U.S.C. 154(b) by 154 days.

(21) Appl. No.: 16/037,271

(22) Filed: Jul. 17, 2018

(65) Prior Publication Data

US 2019/0018903 A1    Jan. 17, 2019

Related U.S. Application Data

(60) Provisional application No. 62/533,488, filed on Jul. 17, 2017.

(51) Int. Cl.
*G06F 16/957* (2019.01)
*G06F 16/958* (2019.01)
*G06F 8/71* (2018.01)
*G06F 8/65* (2018.01)
*H04L 29/06* (2006.01)

(52) U.S. Cl.
CPC ............ *G06F 16/9574* (2019.01); *G06F 8/65* (2013.01); *G06F 8/71* (2013.01); *G06F 16/958* (2019.01); *H04L 67/42* (2013.01)

(58) Field of Classification Search
CPC ...... G06F 16/9574; G06F 16/958; G06F 8/65; G06F 8/71; H04L 67/42
See application file for complete search history.

(56) References Cited

U.S. PATENT DOCUMENTS 6,598,048 B2 * 7/2003 Carneal ................... H04L 67/28
7,222,161 B2 * 5/2007 Yen .......................... H04L 67/16
709/217

(Continued)

*Primary Examiner* — Alina A Boutah
(74) *Attorney, Agent, or Firm* — Roeder & Broder LLP; James P. Broder

(57) ABSTRACT

A method for increasing interaction speed between a website and a client device includes storing on an HTML5 local storage database on the client an ECMAScript file and a parameter from a web server of the website, and subsequently comparing a web server version number of the ECMAScript from the web server with the local version number of the parameter stored on the HTML5 local storage database. The parameter specifies a local version number of the ECMAScript file. The method can also include updating the ECMAScript stored on the HTML5 local storage database with the ECMAScript file from the web server when the web server version number is greater than the local version number. The method can also include loading the website on the client by retrieving the ECMAScript file from the HTML5 local storage database. Retrieving the ECMAScript file from the HTML5 local storage database can occur when the web server version number is the same as the local version number. The method can also include loading the website on the client by retrieving the ECMAScript file from the HTML5 local storage database.

18 Claims, 2 Drawing Sheets

(56) References Cited

U.S. PATENT DOCUMENTS

| | | | | |
|---|---|---|---|---|
| 8,176,321 B1* | 5/2012 | Perry | H04L 51/12 | 713/167 |
| 8,195,767 B2* | 6/2012 | Albrecht | G06F 16/9574 | 709/219 |
| 8,429,247 B1* | 4/2013 | Nordman | G06F 16/9574 | 709/218 |
| 8,667,480 B1* | 3/2014 | Sigurdsson | G06F 9/44526 | 717/168 |
| 9,275,162 B2* | 3/2016 | Brown | H04L 67/2847 | |
| 9,467,563 B1* | 10/2016 | Kumar | H04M 3/4938 | |
| 9,471,552 B1* | 10/2016 | Kolam | H04L 67/02 | |
| 10,412,176 B2* | 9/2019 | Ma | G06F 16/955 | |
| 2002/0010761 A1* | 1/2002 | Carneal | H04L 67/28 | 709/219 |
| 2002/0023141 A1* | 2/2002 | Yen | H04L 67/16 | 709/217 |
| 2005/0071766 A1* | 3/2005 | Brill | G06F 16/951 | 715/738 |
| 2005/0267798 A1* | 12/2005 | Panara | G06Q 30/0264 | 705/14.61 |
| 2010/0161717 A1* | 6/2010 | Albrecht | G06F 16/9574 | 709/203 |
| 2011/0099294 A1* | 4/2011 | Kapur | H04L 67/02 | 709/246 |
| 2011/0264494 A1* | 10/2011 | Lechowicz | G06Q 30/02 | 705/14.12 |
| 2012/0036264 A1* | 2/2012 | Jiang | H04L 67/02 | 709/226 |
| 2012/0084346 A1* | 4/2012 | Mickens | G06F 16/9574 | 709/203 |
| 2013/0024759 A1* | 1/2013 | Yuan | G06F 16/9574 | 715/205 |
| 2013/0275957 A1* | 10/2013 | Villar | G06F 9/452 | 717/173 |
| 2013/0283182 A1* | 10/2013 | Dadu | H04L 41/0809 | 715/740 |
| 2014/0019847 A1* | 1/2014 | Osmak | G06F 16/9577 | 715/234 |
| 2014/0067835 A1* | 3/2014 | Harrison | G06F 8/61 | 707/755 |
| 2014/0129925 A1* | 5/2014 | Faletski | G06F 40/154 | 715/234 |
| 2014/0235351 A1* | 8/2014 | Takushima | A63F 13/12 | 463/42 |
| 2014/0366117 A1* | 12/2014 | Kumar | H04L 63/02 | 726/11 |
| 2015/0281647 A1* | 10/2015 | Xin | G06F 3/0428 | 348/14.09 |
| 2015/0365359 A1* | 12/2015 | Hasan | H04L 51/10 | 709/206 |
| 2016/0043983 A1* | 2/2016 | Bishop | H04L 51/24 | 709/206 |
| 2016/0070813 A1* | 3/2016 | Unter Ecker | G06F 16/986 | 715/234 |
| 2016/0133036 A1* | 5/2016 | Chen | G06Q 10/00 | 345/629 |
| 2016/0359774 A1* | 12/2016 | Beardow | H04L 51/28 | |
| 2017/0046148 A1* | 2/2017 | Moore | G06F 8/65 | |
| 2017/0132991 A1* | 5/2017 | Hwang | G09G 3/2003 | |
| 2017/0161253 A1* | 6/2017 | Silver | H04L 67/02 | |
| 2017/0185395 A1* | 6/2017 | Arians | G06F 8/71 | |
| 2017/0228263 A1* | 8/2017 | Seitz | G06F 9/4411 | |
| 2018/0041590 A1* | 2/2018 | Ma | H04L 67/146 | |
| 2018/0041812 A1* | 2/2018 | Brown | H04L 65/4084 | |
| 2018/0189848 A1* | 7/2018 | Sunfeng | G06F 16/24578 | |
| 2018/0285470 A1* | 10/2018 | Liu | G06F 9/44568 | |
| 2020/0159871 A1* | 5/2020 | Bowen | G06K 9/00362 | |
| 2020/0160612 A1* | 5/2020 | Bowen | G06Q 30/00 | |
| 2020/0250372 A1* | 8/2020 | Remington | G06F 21/53 | |

* cited by examiner

METHOD FOR PROCESSING CODE AND INCREASING WEBSITE AND CLIENT INTERACTION SPEED

RELATED APPLICATION

This application claims priority on U.S. Provisional Application Ser. No. 62/533,488, filed on Jul. 17, 2017, and entitled "METHOD FOR INCREASING WEBSITE AND CLIENT INTERACTION SPEED." As far as permitted, the contents of U.S. Provisional Application Ser. No. 62/533,488 are incorporated herein by reference.

BACKGROUND

Currently, ECMAScript (also sometimes referred to herein as "script" or "script files"), which includes script by the trade name, JavaScript®, are linked to a website and are either downloaded from a server of the website (also referred to herein as a "web server") on each request as files, for example, or the server of the website is configured with a cache policy. The cache policy means that a browser requests script periodically, i.e. every x days, every day, every hour, every minute, etc., as non-exclusive examples. Caching can create problems as the script is not easily updateable. Further, caching can trigger a server request for the script to confirm that these files have not changed and should be loaded from the local cache unless an extensive cache policy is set which then would prevent the "call", and would also prevent updating the content of the script. The use of script is a primary functionality on a client side of each website and script files can grow to a respectable file size.

FIG. 1 illustrates one prior art method for interaction between a client and a website. At step 10P, a website request is made by a client (also sometimes referred to herein as a "local computer" or "local storage"). As used herein, the terms "client" and "client device" are interchangeable, and intended to mean any computing system that can access the Internet.

At step 12P, the web server is queried with the website request.

At step 14P, a web browser receives and processes hypertext markup language ("HTML") code. In the example provided in FIG. 1, the HTML code requires the action of requesting three script files from the web server.

At step 16P, the web browser receives the three requested script files. In one prior art embodiment, the requested script files can be retrieved from the web server. Alternatively, the requested script files can be retrieved from a cache from the local computer. The particular route of the requested script files can be determined by the web server or by a cache policy of the local computer. In the event of use of the latter, the cache policy can determine that the script file(s) should only be requested from the web server after a predetermined amount of time has passed.

At step 18P, the website is loaded onto the client. In this prior art example, a total of four requests have been made: the initial website request, and the three subsequent requests for the three script files. As yet, this inefficiency (i.e. four requests) has not been satisfactorily resolved.

SUMMARY

The present invention is directed toward a method for increasing interaction speed between a website and a client device. In certain embodiments, the method includes the steps of storing on an HTML5 local storage database on the client an ECMAScript file and a parameter from a web server of the website, the parameter specifying a local version number of the ECMAScript file; and subsequently comparing a web server version number of the ECMAScript from the web server with the local version number of the parameter stored on the HTML5 local storage database.

In some embodiments, the method can include the step of updating the ECMAScript stored on the HTML5 local storage database with the ECMAScript file from the web server when the web server version number is greater than the local version number.

In certain embodiments, the step of retrieving the ECMAScript file from the HTML5 local storage database occurs when the web server version number is the same as the local version number.

In various embodiments, the method can also include the step of loading the website on the client by retrieving the ECMAScript file from the HTML5 local storage database.

In some embodiments, the method also includes the step of appending the ECMAScript file as inline ECMAScript code to the website.

In another embodiment, the method for increasing interaction speed between a website and a client device can include the steps of storing on an HTML5 local storage database on the client an ECMAScript file and a parameter from a web server of the website, the parameter specifying a local version number of the ECMAScript file; and updating the ECMAScript file stored on the HTML5 local storage database with the ECMAScript file from the web server when the web server version number is greater than the local version number.

In certain embodiments, the method can also include the step of loading the website on the client by retrieving the ECMAScript file from the HTML5 local storage database.

In various other embodiments, the method can include the step of loading the website on the client by retrieving the ECMAScript file from the HTML5 local storage database.

In alternative embodiments, the method can also include the step of the website retrieving ECMAScript file content from the HTML5 local storage database.

In another embodiment, the method for increasing interaction speed between a website and a client can include the steps of storing an ECMAScript file from a web server of the website onto an HTML5 local storage database on the client; and the website retrieving the ECMAScript file from the HTML5 local storage database.

In certain embodiments, the method can also include the step of appending the ECMAScript file content as inline ECMAScript code to the webpage.

In various embodiments, the method can also include the step of updating the parameter stored on the HTML5 local storage database with a parameter from the web server when the web server version number is different than the local version number.

In some embodiments, the step of storing can include storing a parameter from a web server of the website, the parameter specifying a local version number of the ECMAScript file.

In certain embodiments, the method can also include the step of appending the ECMAScript file as inline ECMAScript code to the website.

In alternative embodiments, the method can also include the step of updating the parameter stored on the HTML5 local storage database with a parameter from the web server when the web server version number is greater than the local version number.

In some embodiments, the step of retrieving the ECMAScript file from the HTML5 local storage database can occur when the web server version number is the same as the local version number.

In various embodiments, the method can also include the step of loading the website on the client by retrieving the ECMAScript file from the HTML5 local storage database.

The present invention is also directed toward a system that utilizes any of the methods shown and/or described herein.

BRIEF DESCRIPTION OF THE DRAWING

The novel features of this invention, as well as the invention itself, both as to its structure and its operation, will be best understood from the accompanying drawing, taken in conjunction with the accompanying description, in which similar reference characters refer to similar parts, and in which.

DESCRIPTION

Figure 1:
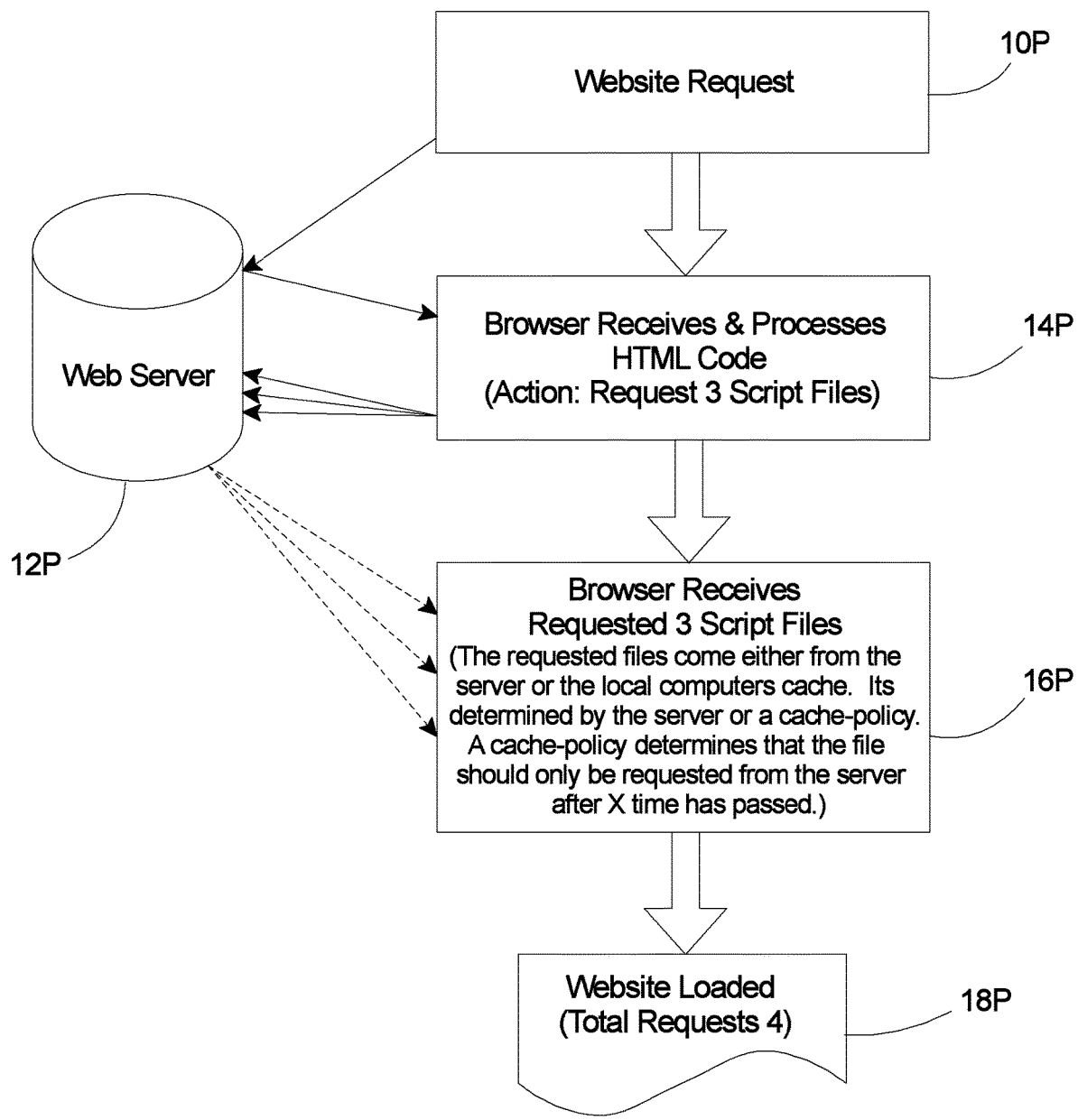
FIG. 1 is a flow chart illustrating a prior art method for interaction between a website and a client.

Embodiments of the present invention are described herein in the context of a method for increasing website and client interaction speed. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

As an overview, the present invention improves the speed when loading a website by storing the ECMAScript locally while allowing the website to update the scripts to a newer version number only if necessary. The invention utilizes an existing hypertext markup language version number 5 ("HTML5") local storage database (also referred to as a "client" or a "local storage") to store and/or compress web application necessary ECMAScript files. Although the term "HTML5" is used herein, it is recognized that later version numbers can equally be used in the future with the present invention, should those be developed and should they be suitable for this application. Use of the term HTML5 is used for ease of understanding and is not intended to limit the scope of this invention in any manner. The methods provided herein allow a web application to store large ECMAScript files on the client side which will be retrieved and added to the loaded webpage relatively quickly or substantially instantaneously. This is a huge speed and data load advantage as it is not linking to files on the web server or the browser cache and can be updated on demand at the same time when a version number changes, or at other suitable times. The methods described herein addresses previously unresolved issues by storing all scripts in the local storage on the client and by retrieving these scripts and/or files quickly or substantially instantaneously. The scripts can easily be updated by changing the version number within a supplied variable within the website.

Figure 2:
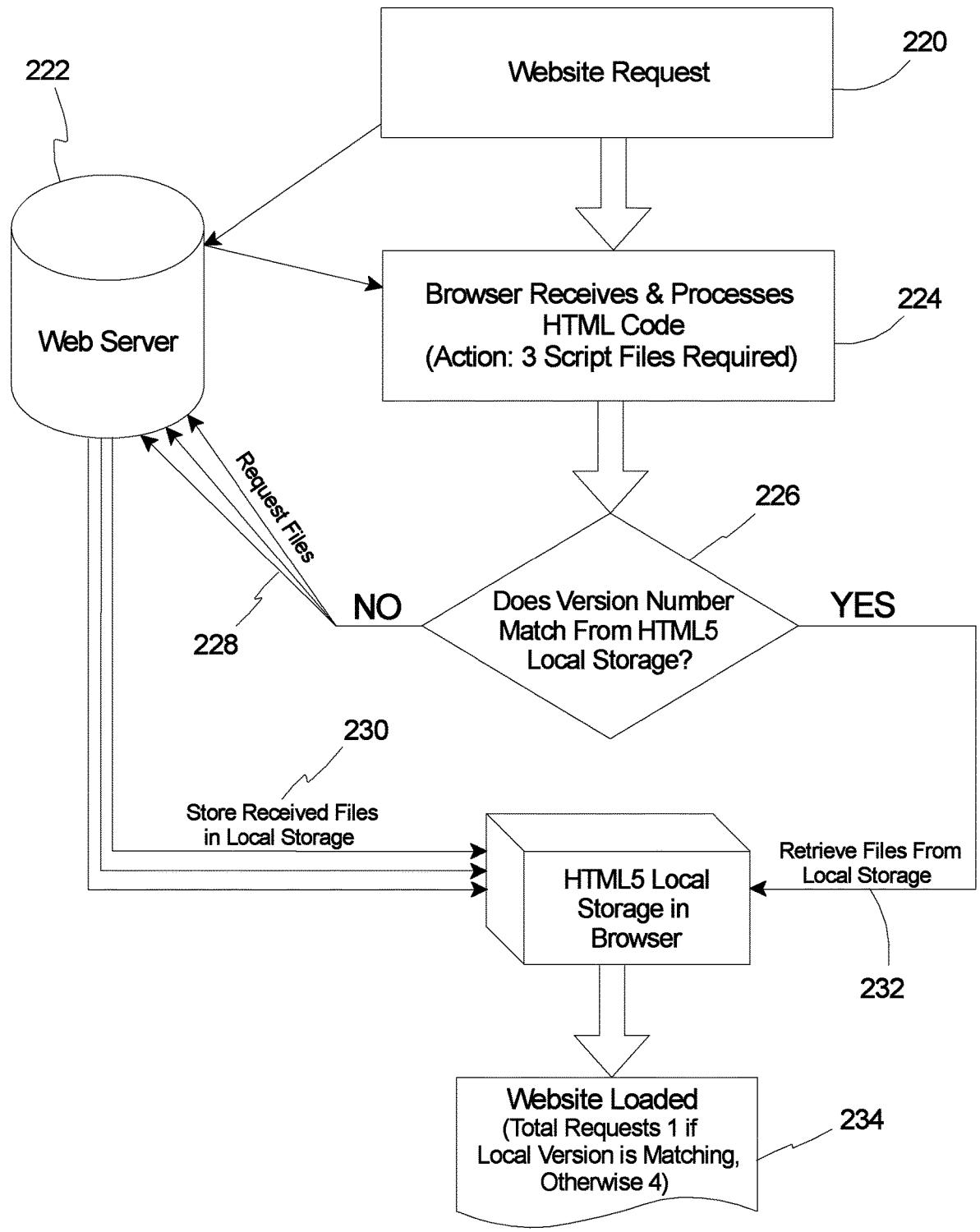
FIG. 2 is a flow chart of one embodiment of a method for increasing website and client interaction speed having features and/or steps of the present invention.

FIG. 2 is a flow chart showing steps of one embodiment of a method for increasing website and client interaction speed. It is understood that the method pursuant to the disclosure herein can include greater or fewer steps than those shown and described relative to FIG. 2. Stated another way, the method according to the present invention can omit one or more steps illustrated in FIG. 2, or can add additional steps not shown and described in FIG. 2, and still fall within the purview of the present invention. Further, the sequence of the steps can be varied from those shown and described relative to FIG. 2. The sequence of steps illustrated in FIG. 2 is not intended to limit the sequencing of steps in any manner.

In the embodiment illustrated in FIG. 2, at step 220, a website request is made by a client. As used herein, the term "client" means any computing system that can access the Internet.

At step 222, the web server is queried with the website request.

At step 224, a web browser of the client receives and processes HTML code. In the example provided in FIG. 2, the HTML code requires the action of requesting three script files from the web server. In certain embodiments, the website can contain a parameter that specifies a web server version number, for example, a custom HTML tag, e.g., <localversion number> (or any other suitable name), with the current web server version number, e.g. web server version number "1", and an ECMAScript. In one embodiment, this parameter is then loaded and stored on an HTML5 local storage database on the client via an asynchronous hypertext transfer protocol ("http") request, such as an Asynchronous JavaScript And XML ("AJAX") request, for example, as local version number "1". This parameter can be stored as an inline script, although it can alternatively be stored in another suitable location on the client, or as a different type of script.

At step 226, when the web server loads the ECMAScript it can compare the web server version number from the parameter to the local version number stored in the HTML5 local storage database.

At step 228, if the web server version number of the parameter from the <localversion number> tag does not match the local version number stored on the HTML5 local storage database (e.g., the web server version number is "2" in this example), or if a local version number does not yet exist on the HTML5 local storage database, the script will locate further parameters that link to the ECMAScript files, e.g., HTML tags named <localscript></localscript> (or any other suitable name).

At step 230, the script files specified from the web server will then be loaded via another AJAX request, into the HTML5 local storage database. In other words, in this embodiment, the HTML5 local storage database is updated with the newer version number, i.e. from "1" to "2". The filename can then be used as a key to store the content of the script file(s).

At step 232, if the web server version number of the parameter from the <localversion number> tag matches the local version number stored on the HTML5 local storage database (e.g., the web server version number and the local version number are each "1", for example), the script files will be retrieved from the HTML5 local storage database.

At step 234, the ECMAScript file content is retrieved from the HTML5 local storage database and can be appended as ECMAScript code to the webpage. If the web browser used by the client doesn't support the HTML5 local storage database feature, the script can locate and link the files according to a previously known and understood method. With this design, if the web server version number of the parameter from the <localversion number> tag matches the local version number stored on the HTML5 local storage database, the total number of requests that are made is only one, which results in improved speed of interaction between the website and the client. On the other hand, in the event the web server version number of the parameter from the <localversion number> tag does not match the local version number stored on the HTML5 local storage database, a total of four requests are made, which is no slower than the prior art method described with respect to FIG. 1.

It is understood that although a number of different embodiments of methods for increasing website and client interaction speed have been described herein, one or more features of any one embodiment can be combined with one or more features of one or more of the other embodiment, provided that such combination satisfies the intent of the present invention.

While a number of exemplary aspects and embodiments of methods for increasing website and client interaction speed have been shown and disclosed herein above, those of skill in the art will recognize certain modifications, permutations, additions and sub-combinations thereof. It is therefore intended that the system and method shall be interpreted to include all such modifications, permutations, additions and sub-combinations as are within their true spirit and scope, and no limitations are intended to the details of construction or design herein shown.

What is claimed is:

1. A method for increasing interaction speed between a website and a client, the method comprising the steps of:
   receiving and processing an HTML5 code from a web server, the HTML5 code requiring the action of requesting three script files from the web server;
   storing on an HTML5 local storage database on the client an ECMAScript file and a parameter from the web server of the website, the parameter specifying a local version number of the ECMAScript file; and
   subsequently comparing a web server version number of the ECMAScript file from the web server with the local version number of the parameter stored in the HTML5 local storage database;
   wherein the parameter is loaded and stored on the HTML5 local storage database on the client via an asynchronous JavaScript and XML request and the parameter is stored as an inline script.

2. The method of claim 1 further comprising the step of retrieving the ECMAScript file from the HTML5 local storage database occurs only when the web server version number is the same as the local version number.

3. The method of claim 1 further comprising the step of updating the ECMAScript file stored on the HTML5 local storage database with the ECMAScript file from the web server when the web server version number is different than the local version number.

4. The method of claim 1 further comprising the step of updating the ECMAScript file stored on the HTML5 local storage database with the ECMAScript file from the web server when the web server version number is greater than the local version number.

5. The method of claim 4 further comprising the step of appending the ECMAScript file as an inline ECMAScript code to the website.

6. The method of claim 4 further comprising the step of loading the website on the client by retrieving the ECMAScript file from the HTML5 local storage database.

7. The method of claim 1 further comprising the step of retrieving the ECMAScript file from the HTML5 local storage database occurs when the web server version number is the same as the local version number.

8. The method of claim 1 further comprising the step of locating a plurality of additional parameters that link to the ECMAScript file when a web browser used by the client does not support the HTML5 local storage database.

9. The method of claim 1 further comprising the step of updating the parameter stored on the HTML5 local storage database with an updated parameter from the web server when the web server version number is greater than the local version number.

10. The method of claim 9 wherein the updated server parameter has a filename that is used as a key to store the content of the ECMAScript file.

11. The method of claim 1 wherein the total number of requests made by the client equals four.

12. The method of claim 1 further comprising the step of loading the website on the client by retrieving the ECMAScript file from the HTML5 local storage database only when the web server version number is the same as the local version number.

13. The method of claim 11 wherein the total number of requests made by the client equals one.

14. The method of claim 1 further comprising the step of querying the web server with a website request.

15. The method of claim 1 wherein the web server loads the ECMAScript file and compares the web server version number of the ECMAScript file from the web server with the local version number of the parameter stored in the HTML5 local storage database.

16. The method of claim 1 further comprising the step of locating a plurality of additional parameters that link to the ECMAScript file when the local version number of the parameter does not exist in the HTML5 local storage database.

17. The method of claim 15 wherein the plurality of additional parameters are HTML tags.

18. The method of claim 16 wherein the HTML tags are named <localscript></localscript>.

* * * * *